United States Patent Office 3,789,027
Patented Jan. 29, 1974

3,789,027
MICROPOROUS SHEET STRUCTURE
Harro Träubel and Wolfgang Klebert, Leverkusen, Germany, assignors to Bayer Aktiengesellschaft, Leverkusen, Germany
No Drawing. Continuation of application Ser. No. 86,591, Nov. 3, 1970. This application July 25, 1972, Ser. No. 274,952
Int. Cl. C08g 22/44, 53/14
U.S. Cl. 260—2.5 AY                 2 Claims

ABSTRACT OF THE DISCLOSURE

Permeable microporous sheet structure prepared by the reaction of monomeric isocyanates or isocyanate terminated prepolymers with polyamines in polyisocyanate nonsolvents and with subsequent removal of solvents and nonsolvents.

This is a continuation of application Ser. No. 86,591 filed Nov. 3, 1970.

This invention relates to microporous sheet structures and particularly to microporous sheet structures which are permeable to water vapor and a method of preparing the same. More particularly, the invention relates to a method of preparing microporous sheet structures by an isocyanate polyaddition process.

It has heretofore been proposed to prepare stable, aqueous polyurethane dispersions. For example, such dispersions are prepared by dispersing a polyurethane in water, optionally in the presence of an emulsifier, and then reacting the dispersion with a chain lengthening agent, for example, a diamine. The polyurethane employed is obtained by reacting an organic polyhydroxy compound with a polyisocyanate. These stable aqueous polyurethane dispersions have found numerous uses. They may be used in the production of homogeneous sheet structures such as films or coatings. These stable aqueous polyurethane dispersions have not proven entirely satisfactory in that the heretofore known dispersions are impermeable to water vapor or are non-porous and therefore not particularly suitable as substitutes for leather.

It is, therefore, an object of the present invention to provide microporous sheet structures which are permeable to water vapor and which avoid the disadvantages set forth above. An object of this invention is to provide microporous sheet structure with improved water vapor permeability. An object of the invention is to provide a process for producing microporous sheet structure with improved water vapor permeability. Another object of this invention is the formation of microporous sheet structure, which is permeable to water vapor, by the isocyanate polyaddition process. A still further object of this invention is to provide a microporous sheet structure which is permeable to water vapor wherein the sheet structure is formed by an isocyanate polyaddition process in which the reaction mixture is applied to a porous or non-porous substrate support before the polyaddition reaction is completed. A still further object of this invention is to provide a process for preparing microporous sheet structure which is permeable to vapor wherein the sheet structure is formed by an isocyanate polyaddition process in which the reaction mixture is applied to a porous or non-porous substrate before the polyaddition reaction is completed. An additional object of this invention is to provide water vapor permeable sheet structure by the isocyanate polyaddition process in which the reaction mixture is applied to a porous or non-porous substrate support before the polyurethane addition reaction is completed and any organic solvents are removed. Additionally, an object of this invention is to provide a process for preparing water vapor permeable sheet structure by the isocyanate polyaddition process in which the reaction mixture is applied to a porous or non-porous substrate support before the polyaddition reaction is completed and any organic solvents are removed. Also, an object of this invention is to provide microporous sheet structure which is permeable to water vapor and has good mechanical properties, very high flexibility and which shows excellent resistance to solvents. A further additional object of this invention is a process for the preparation of microporous sheet structure which is permeable to water vapor and has good mechanical properties, very high flexibility and which shows excellent resistance to solvents.

The foregoing objects and others which will become apparent from the following description are accomplished in accordance with the invention, generally speaking, by water vapor permeable microporous sheet structure which is prepared by the isocyanate polyaddition process whereby monomeric polyisocyanates or isocyanate terminated prepolymers, optionally dissolved in organic solvents for the isocyanates, have added to them, at least 40% by weight, based upon the polyisocyanate, of nonsolvents for the isocyanate and the mixture is stirred, preferably without an emulsifier, to form a nonsolvent in isocyanate dispersion containing isocyanate groups, which dispersion is reacted with substantially equivalent quantities of a compound bearing at least two reactive hydrogen atoms on at least two and not more than six nitrogen atoms, the reaction mixture being applied to porous or non-porous supports before completion of the reaction, and any solvents present are removed. In other words, this invention contemplates the formation of water vapor permeable microporous sheet structure by the polyisocyanate polyaddition process wherein the reaction mixture is applied to supports before the polyaddition reaction is completed and the solvents, non-solvents and other organic solvents, if present, are removed. Non-solvent in the context of this invention is understood to be a liquid which does not dissolve the polyisocyanate, isocyanate terminated prepolymer or the final microporous sheet structure.

Any suitable polyisocyanate may be used. Examples of suitable monomeric organic polyisocyanates which may be used in the process according to this invention are ethylidene-, ethylene-, propylene-, tetramethylene- and hexamethylene diisocyanate, 1,2-cyclohexanediisocyanate, 1,4 - cyclohexanediisocyanate, 1,3 - cyclopentylenediisocyanate, arylenediisocyanates and alkylated products thereof such as xylylene diisocyanates, m- and p-phenylenediisocyanate, 2,4- and 2,6-toluylene diisocyanate and isomeric mixtures thereof, 2,2'-diphenylpropane-4,4'-diisocyanate, 4,4'-diphenylmethane diisocyanate, 1,4-naphthalene diisocyanate, 1,5-naphthylene diisocyanate, diphenyl diisocyanate, diphenyl-2,4,4'-triisocyanate, triphenylmethane triisocyanate and the reaction product having the formula

OCN—(CH$_2$)$_6$—N(CONH—(CH$_2$)$_6$NCO)$_2$ obtainable by reaction between 3 mols of hexamethylenediisocyanate and 1 mol of water, furfurylidene diisocyanate, diphenylsulfone-4,4-diisocyanate and the like.

NCO terminated prepolymers are reaction products containing free isocyanate groups which may be obtained by reaction between high molecular weight compounds containing at least two active hydrogen atoms and monomeric polyisocyanates, preferably diisocyanates. Active hydrogen containing compounds which may be reacted with polyisocyanates are substantially linear or branched polyesters containing free hydroxyl groups, polyester amides, polyethers, polythioethers or polyacetals, the molecular weights of which should be above 500 and preferably above 750. In addition, however, one may also use compounds which contain terminal carboxyl, amino or mercapto groups, and polysiloxanes which contain groupings which react with isocyanates.

Any suitable polyesters or polyester amides may be used such as, for example, those obtained from the usual components, of which, for example, hydroxycarboxylic acids, dicarboxylic acids, glycols, diamines, amino alcohols and aminocarboxylic acids are exemplary. Acids which may be used are hydroxycaproic acid, malonic acid, succinic acid, adipic acid, methyladipic acid, sebacic acid, thiodipropionic acid, maleic acid and phthalic acid and the like. Glycols which may be used are ethylene glycol, di-, tri- and polyethylene glycols, 1,2-propylene glycol, 1,4-butylene glycol, 1,6-hexanediol, glycerol, pentaerythritol, trimethylolpropane and hexanetriol and the like.

Any suitable amine or aminoalcohol may be used in the preparation of the polyester amides, such as, for example, ethylenediamine, tetramethylene diamine, hexamethylene diamine, piperazine, phenylene diamine, ethanolamines, propanolamine and N-methyldiethanolamine and the like. The preparation of the polyesters and polyester amides may be carried out in a known manner by heating the reactants to elevated temperatures.

Any suitable polyhydric polyethers may be used such as, for example, those obtained by polymerization of alkylene oxides, or by the addition of alkylene oxides or mixtures thereof to polyfunctional alcohols such as ethylene glycol, trimethylolpropane or glycerol or to ethylene-diamine and the like. The polyethers are all bi- or polyfunctional with respect to the hydroxyl end groups.

Any suitable polythioethers may be used such as, for example, those obtained by condensation of thiodiglycol either with itself or with sulphur-free polyalcohols such as those disclosed above.

Any suitable polyacetal may be used, such as, for example, the reaction product of formaldehyde or other suitable aldehyde with a polyhydric alcohol such as those disclosed above.

The NCO terminated prepolymers may be prepared in a known manner simply by heating the reactants together. The quantity of monomeric polyisocyanate used in this reaction should be so calculated that the isocyanate groups used are always in excess of the reactive end groups of the othr components. Low molecular weight glycol such as are mentioned above, for example, in the list of polyester components, may be used as chain lengthening agents in the production of the NCO terminated prepolymers, in addition to the higher molecular weight starting products. The prepolymers are obtained in the form of solid or waxy masses, or viscous liquids, depending on the starting materials used. Before they are used in the process according to the invention they may be adjusted to a suitably low viscosity by the addition of organic solvents.

Any suitable solvents for the monomeric polyisocyanate or the NCO terminated prepolymer may be used and include, for example, aromatic hydrocarbons such as benzene, toluene and xylene as well as Decalin and Tetralin, commercial solvent mixtures which contain aromatic hydrocarbons, such as mineral spirits sold under the name of Sangajol, cycloaliphatic hydrocarbons such as cyclohexane, methyl cyclohexane, turpentine oil, chlorinated hydrocarbons such as methylene chloride, chloroform, carbon tetrachloride, dichloroethylene, tetrachloroethane, hexachloroethane, ethylene chloride, dichloroethylene, trichloroethylene, perchloroethylene, dichloropropane, chlorocyclohexane or chlorobenzene, esters such as methyl, ethyl, propyl or butyl acetate, formic acid esters, ethylene glycol acetate, b-methoxyethyl acetate, or b-ethoxyethyl acetate, ketones such as acetone, butanone-(2), pentanone-(2), cyclohexanone or methylcyclohexanone, ethers such as di-n-propylether, diphenylether, tetrahydrofuran, furan or dioxane, nitro compounds such as nitromethane, nitrobenzene and alcohols such as methanol, ethanol, propanol, butanol, cyclohexanol (methyl-, ethyl-, propyl-) glycol, or diacetone alcohol and the like.

If solvents containing reactive hydrogen atoms are used, the compound which contains isocyanate groups must be worked up quickly because otherwise undesirable reaction of the isocyanate groups with the solvent takes place.

Nonsolvents (in which the monomeric polyisocyanates, the NCO containing prepolymers or the microporous sheets are insoluble) include water, glycols such as ethylene glycol, propanediol, butanediol, aliphatic hydrocarbons such as hexane or heptane and commercial solvent mixtures such as petroleum ether, ligroin, cleaning petrol (gasoline), mineral spirit and Shellsol T (an aliphatic, hydrocarbon solvent composed of a mixture of paraffinic, naphthenic and aromatic hydrocarbons) and the like. Water is preferably used.

The nonsolvents must have evaporation numbers which are at least three times as great as the evaporation number of the other solvent. Determination of evaporation numbers is described in DIN 53170.

The dispersions which are formed when the non-solvents e.g. water are added to monomeric polyisocyanates or NCO containing prepolymers or their solutions, generally show a sharp rise in viscosity compared with the viscosities of the starting solutions. If the viscosity does not rise, or a sudden drop in viscosity occurs during the addition of nonsolvent, it is a sign that the dispersion has broken down. The inhomogeneous, collapsed dispersion can also be reacted with polyamino compounds to obtain microporous sheet structures, but the films obtained in such cases are not very satisfactory. It is advisable to make a preliminary determination of the maximum quantity of non-solvent that can be tolerated by the monomeric polyisocyanate or the NCO terminated prepolymer or a solution thereof without the dispersion breaking down. The non-solvent is generally employed in a quantity slightly below the maximum quantity so determined. It amounts to at least 40% of the monomeric polyisocyanate or NCO terminated prepolymer used in the reaction.

The quantity of non-solvent used depends on the nature of the monomeric polyisocyanates or NCO terminated prepolymer used and in some cases also on the other solvent. The isocyanate insoluble solvent must be added slowly so that the dispersion does not break down prematurely. In other words, the water or non-solvent forms the discontinuous phase.

The compound bearing at least two active hydrogen atoms on at least two and not more than six nitrogen atoms may have the individual active hydrogen atoms on the same nitrogen atom as in primary amines or on different nitrogen atoms as in secondary diamines. The following compounds may be used as compounds bearing at least two active hydrogen atoms on at least two and not more than six nitrogen atoms, which compounds are added to the dispersion: ethylene diamine, diethylene triamine, triethylene tetramine, tetraethylene pentamine, pentaethylene hexamine and higher condensates, propylene diamine, dipropylene triamine and higher condensates, tetramethylene diamine, pentamethylene diamine, hexamethylene diamine, 1,12-diaminododecane, N-methyl-diaminopropane, N,N'-dimethyl-ethylene diamine, other N-alkylated homologous diamines, hexahydrophenylene diamine, piperazine, 2,5 - dimethylpiperazine, 2,4-diamino-6-phenyl-triazine, phenylenediamine, 4,4' - diamino-diphenylmethane, 1-methyl-2,4-diamino benzene and homologous aromatic polyamines, hydrazine, semicarbazide, carbodihydrazide, guanidine, N,N'-dimethylurea and phenylguanidine and the like. If the polyamines are too highly reactive, as is the case with aliphatic polyamines, in particular, the carbonates of the corresponding polyamines can be used. Although the polyamine may be added to the dispersion in bulk, it is preferably dissolved in an isocyanate insoluble solvent, which solvent may be identical with that used for the preparation of the dispersion, and is preferably water.

In order to obtain addition compounds having as high a molecular weight as possible, the polyamine will preferably be reacted in equivalent quantities with the monomeric polyisocyanate or NCO terminated prepolymer. It is particularly important that attention be paid to the molar quantities of functional groups, for example, the NCO/NH ratio, which, at the theoretically optimum reaction of the isocyanate groups with amino groups is preferably equal to 1. If ratios 50% higher or lower than this given ratio are used (for example, NCO:NH values of 0.5 to 1.5), the products obtained can generally be used, but their physical properties are in many cases less satisfactory than those obtained when the NCO/NH ratios are equal to or approximately equal to 1.

The polyfunctional nitrogen-containing bases which are used often require suitable adaptation of the apparatus employed. When using apparatus which permit high mixing speeds and short shaping times, the choice of monomeric polyisocyanates or NCO terminated prepolymers and polyamines is substantially free. When carrying out laboratory tests, prolonged stirring and shaping times are frequently necessary and reactants are, therefore, chosen which provide sufficient working up time before the shaping process is carried out. When using relatively fast reacting polyisocyanates (for example, compounds containing aromatic isocyanate groups) the amino groups used are, therefore, of low basicity, as is the case with hydrazine, hydrazine derivatives, aliphatic polyammonium carbonates and aromatic polyamines. Many aliphatic polyamines, especially those of strong basicity, often react so rapidly with monomeric polyisocyanates or NCO terminated prepolymers containing aromatic isocyanate groups that no reproducible experiments can be carried out under the usual laboratory conditions. In contrast thereto, isocyanates which react more slowly, for example, compounds containing aliphatic isocyanate groups, may be reacted with more strongly basic polyamines such as aliphatic or cycloaliphatic polyamines, hydrazine, guanidine, and piperazine. The reactants should be so chosen that their reaction with the isocyanate insoluble solvents and which contain active hydrogen atoms, for example, water or ethylene glycol, is of little significance.

The rate of reaction of the monomeric polyisocyanates or NCO terminated prepolymers with the polyamine compounds is dependent upon temperature. The reactants may well be mixed at room temperature, for example, 22° C. The dispersion obtained is then poured onto substrates which are usually preheated before the addition reaction is completed, and the dispersion is then heated at elevated temperature (preferably 60 to 80° C.) to complete the addition reaction. The temperature should be slightly below the boiling point of the solvent or the mixture of solvents. When all the solvent has evaporated, the temperature may be increased in order to remove the isocyanate insoluble solvent completely.

The reaction of the monomeric polyisocyanate or the NCO terminated prepolymers with polyamines may be catalyzed by means of the catalysts commonly used for this purpose, for example, diazabicyclo-octane, ureas, tertiary amines such as dimethylbenzylamine, or compounds of lead, tin, cobalt or zinc.

The process is generally carried out as follows: The non-solvent is dispersed in the monomeric polyisocyanate or the NCO-terminated prepolymer or their solution in an organic solvent, preferably by means of a high speed stirrer. The preferred non-solvent is water. Subsequently the polyfunctional NH-compound or a solution thereof is added to the resulting dispersion with stirring. The stirring time is a critical factor since it must neither be too short because otherwise mixing is not sufficiently thorough, nor must it be too long because otherwise relatively stable dispersions are obtained which, on drying, yield films which show only slight permeability to water vapor or, what is more likely, the reaction mixture becomes too solid. The optimum stirring time is, therefore, predetermined by carrying out a preliminary determination. The following exemplary technique may be employed for this purpose:

(1) the isocyanate content is measured spectroscopically or
(2) the reaction of the monomeric polyisocyanate or NCO terminated prepolymer with the polyfunctional NH compound is stopped by the addition of hydrochloric acid, and the excess of hydrochloric acid is back titrated with sodium hydroxide solution, so making it possible to determine the unreacted NH groups still present.

The optimum stirring time is such that it allows one-half to three-quarters of the reactive groups to have undergone reaction. Although this value may be changed when high proportions of organic solvents and water are present, free reactive groups should in any event still be present.

The reaction mixture, which in the preferred case has a creamy consistency, is then applied to a permeable or impermeable substrate. Examples of impermeable substrates are glass plates, metal plates or silicone rubber matrices and the like, while examples of permeable substrates are split leather, grain leather, knitted or woven textiles, fleeces, felts, paper or cardboard and the like.

The polyaddition process is completed at a suitable reaction temperature and if present, the solvent in which the monomeric polyisocyanate or NCO terminated prepolymer had initially been dissolved, is evaporated off. The non-solvent which is also present may be evaporated off at the same time or subsequently, if desired, at reduced pressure.

The microporous sheet structures obtained have particularly good mechanical properties and very high flexibility and show excellent resistance to solvents.

The permeability to water vapor of the resulting microporous sheet structures is dependent upon the quantities of the various solvents and non-solvents. A predetermined permeability to water vapor can only be obtained if in a preliminary test series the quantities of solvents and non-solvents used are varied and the permeability in the sheet samples obtained is determined. Once the conditions for a certain permeability are found they will always produce the same permeability again. Permeability is given in milligrams per hour and square centimeter (mg./hcm.$^2$) and determined according to "Das Leder" 1961, pages 86–88 or J. Soc. Leather Trade's Chem. 1960, pages 502–505.

Other polymers may be added to the monomeric polyisocyanate or NCO terminated prepolymer in order to modify the product, preferably before the dispersion with the isocyanate insoluble solvent. The polymer can, in such a case, be added in solid form, in solution or as a dispersion. Examples of such polymers are polyvinyl compounds such as polyvinyl chloride or polyvinyl alcohol, polyethylene, polystyrene, polyacrylonitrile, polymers of acrylonitrile, butadiene and styrene, polyamides and polyurethanes.

Dyes and fillers may also be added to the monomeric polyisocyanate or the NCO terminated prepolymer or its solution or dispersion.

The microporous polyurea film may, in addition, be cross-linked. Cross-linking agents may be added to the monomeric polyisocyanate or NCO terminated prepolymer or to the finished microporous film. Cross-linking agents which may be used include, for example, polyisocyanates, formaldehyde, compounds which split off formaldehyde, and peroxides These agents are preferably added to the monomeric polyisocyanate or NCO terminated prepolymer. If cross-linking using polyisocyanates is desired, it is preferably carried out on the finished microporous film by dipping the film into a solution or dispersion of a polyisocyanate and then heating the film so that the cross-linking reaction may take place.

If a non-porous support is used, the dry microporous sheet structure obtained may be transferred to a porous substrate by means of the reversal process and bonded thereto by means of non-continuous layers of adhesive. The microporous sheet structures obtained by the direct process can be finished by the usual methods used in the production of leather or limitation leather. The sheet structures obtained can be used as substitutes for leather in shoes and similar items.

The invention is further illustrated but is not intended to be limited by the following examples in which all parts and percentages are by weight unless otherwise specified.

PREPARATION OF NCO TERMINATED PREPOLYMERS AS STARTING MATERIALS

A1

About 168 parts of hexamethylenediisocyanate are added to about 1000 parts of a branched polypropylene glycol ether having a molecular weight of 3000, and the mixture is heated to from about 100 to about 110° C. until the free isocyanate group content of the reaction mass has dropped to 3.6% by weight. The reaction takes about 2.5 to 3.5 hours. The end product is then in the form of a clear, yellowish liquid.

A2

As in Example 1, about 1000 parts of a linear polypropylene glycol ether having molecular weight of 2000 are reacted with about 168 parts of hexamethylene diisocyanate at about 100 to about 110° C. until the NCO content is 3.6% by weight. The viscosity of the product is 2.125 centipoises at 25° C.

A3

About 500 parts of a linear polypropylene glycol ether having a molecular weight of 2000 are reacted with about 125 parts of 4,4'-diphenylmethanediisocyanate at about 80 to about 90° C. After about 4 hours, the NCO content of the product is 3.3% by weight; the viscosity of the product is 16.650 centipoises at 25° C.

lent to 10 mmol of NCO) of viscosity 12 seconds (Ford breaker: 4 mm. nozzle) are stirred using a disc stirrer of an Ekato Labormix 26 rotating at about 3000 revolutions per minute. About 50 ml. of water are run into the solution at the rate of ½ ml. per second. After the addition of the about 50 ml. of water, the resulting dispersion has a viscosity of 16 seconds. About 5 ml. of a molar solution of hydrazine in water (equivalent to 10 mmol. $NH_2$) are then added to the dispersion, and after stirring for about 25 seconds (the stirring time is determined in a preliminary test), the dispersion is poured onto a glass plate which has an area of 1100 $cm.^2$, heated to about 75° C. and the dispersion is heated on the glass plate for about 15 hours. The resulting film has a permeability to water vapor of 1.3 mg./$hcm.^2$. The following experiments were carried out in an analogous manner:

| Quality of water (ml.) | Viscosity (sec.) 4 mm. nozzle | Permeability to water vapor (mg./hcm.²) |
|---|---|---|
| 10 |  | 0.8 |
| 50 | 16 | 1.3 |
| 100 | 30 | 2.7 |
| 150 | 44 | 9.1 |
| 160 | 12 | \* <0.5 |
| 180 | 12 | \* <0.5 |

\* No proper coherent microporous sheet was formed, but a blisterous material which was unsuitable.

Example 2

About 25 ml. of a 0.2 molar solution of the NCO terminated prepolymer prepared according to A7 in ethyl acetate (equivalent to 5 mmol NCO) are dispersed in about 60 ml. of water. About 2.5 ml. of a unimolar solution of hydrazine in water (equivalent to 5 mmol $NH_2$) are stirred into the dispersion at about 3000 revolutions per minute, and after about 20 seconds the dispersion is poured onto a metal plate (V4A steel) which has an area of 400 $cm.^2$. After heating for about 15 hours at The NCO terminated prepolymers listed below were prepared in a manner analogous to A1 to A3 from the given components

| Number | Higher molecular weight compound with at least two active hydrogen atoms | Polyisocyanate | Free NCO group content, percent | Consistency or viscosity |
|---|---|---|---|---|
| A4 | A polypropylene glycol ether, molecular weight 2,000, OH number 56 | Toluylene diisocyanate (2,4) | 3.5 | 4,870 cp./25° C. |
| A5 | Polyester of adipic acid and a mixture of hexanediol-(1,6) and 2,2-dimethylpropanediol in the ratio of 65:35, molecular weight 1,700, OH number 66. | Hexamethylene diisocyanate-(1,6). | 4.1 | Unctuous. |
| A6 | Polyester of adipic acid and a mixture of hexanediol-(1,6) and 2,2-dimethylpropanediol in the ratio of 65:35, molecular weight 1,700, OH number 66. | Toluylene diisocyanate-(2,4). | 4.1 | Do. |
| A7 | A polypropylene polyethyleneglycolether (prepared by alternating polymerization of 80 parts of propylene oxide + 20 parts of ethylene oxide), molecular weight 4,150, OH number 27. | Hexamethylene diisocyanate-(1,6). | 2.5 | 1,875 cp./25° C. |
| A8 | Polythioether (prepared by condensation of 70 parts of thiodiglycol and 30 parts of 2,2-dimethylpropanediol-(1,3), molecular weight 1,900, OH number 59. | do | 3.6 | 7,370 cp./25° C. |
| A9 | Polysiloxane of the following formula: $HO-CH_2-Si(CH_3)_2-O-(Si(CH_3)_2-O)_{12}-Si(CH_3)_2-CH_2OH$. | do | 5.3 | 102 cp./25° C. |

PROCESS ACCORDING TO THE INVENTION

Example 1

About 50 ml. of a 0.2-molar solution of the NCO-terminated prepolymer prepared according to A2 (equivaabout 75° C., the microporous film is stripped from the plate. The properties of the film are indicated in Table 1 which also contains details of the properties of other microporous sheet structures produced in an analogous manner.

TABLE 1

| Quantity of prepolymer from A7 (gr.) | Ethyl acetate (ml.) | Water (ml.) | Stirring time (sec.) | Reaction temperature (° C.) | Heating time (hr.) | Thickness of film (mm.) | Tensile strength (kg./cm.²) | Tear propagation resistance (kg./cm.) | Permeability to water vapor (mg./hcm.²) |
|---|---|---|---|---|---|---|---|---|---|
| 8.4 | 14.6 | 60 | 20 | 75 | 18 | 0.35 | 17.8 | 1.4 | 5.1 |
| 8.4 | 14.6 | 30 | 20 | 75 | 18 | 0.34 | 41.2 | 3.0 | 3.1 |
| 16.8 | 14.6 | 60 | 15 | 75 | 18 | 0.65 | 45.1 | 3.6 | 1.2 |
| 25.2 | 14.6 | 60 | 15 | 75 | 18 | 0.88 | 47.5 | 4 | 0.5 |
| 16.8 | 14.6 | 60 | 15 | 22 | 72 | 0.55 | 49.1 | 4.9 | 0.9 |
| 11.6 | 20.2 | 35 | 15 | 75 | 18 | 0.45 | 22.4 | 3.3 | 4.6 |
| 8.4 | 14.6 | 75 | 10 | 80 | 15 | 0.5 | 12 | 1.4 | 8.1 |

TABLE 3

The following microporous films were prepared in accordance with Example 2

| NCO terminated prepolymer prepared according to— | Molar dissolved in— | Quantity (ml.) | Water (ml.) | Polyamino compound | Additional solvent | Quantity (ml.) | Stirring time (sec.) | Heating Temp. (°C.) | Heating Time (hr.) | Tensile strength (kg./cm.²) | Tear propagation resistance (kg./cm.) | Permeability to water vapor (mg./hcm.²) | Thickness (mm.) | NCO/NH |
|---|---|---|---|---|---|---|---|---|---|---|---|---|---|---|
| A2 | 0.226 benzene | 50 | 80 | Hexamethylenediammonium carbonate | Benzene | 10 | 20 | 65 | 20 | 14 | 3.4 | 0.75 | 0.9 | 1.13 |
| A2 | do | 50 | 150 | do | do | 20 | 20 | 65 | 20 | 13.5 | 2.6 | 0.91 | 1.6 | 1.13 |
| A2 | do | 50 | 75 | Ethylenediammonium carbonate | do | 20 | 20 | 65 | 20 | 15.6 | 4.3 | 1.6 | 0.6 | 1.13 |
| A2 | do | 50 | 150 | do | do | 60 | 40 | 65 | 20 | 15.1 | 5.6 | 2.1 | 0.6 | 1.13 |
| A2 | do | 50 | 50 | Hexamethylene diamine | do | 23 | 20 | 65 | 12 | 6.7 | 2.3 | 6.0 | 0.8 | 0.5 |
| A2 | do | 22 | 50 | do | do | 47 | 20 | 65 | 12 | 15 | | 4.6 | 0.3 | 0.5 |
| A1 | 0.2 benzene | 50 | 100 | Hydrazine | | | 20 | 60 | 20 | | | 2.1 | | 1.0 |
| A1 | 0.224 benzene | 50 | 100 | do | | | 40 | 60 | 18 | | | 10.4 | 1.1 | 1.0 |
| A1 | 0.07 benzene | 70 | 100 | do | | | 10 | 80 | 12 | | | 1.5 | | 1.0 |
| A3 | 0.2 toluene | 20 | 20 | Cyclohexane-1,4-diamine | | | 20 | 80 | 12 | | | 5.8 | | 1.0 |
| A3 | do | 40 | 96 | do | | | 20 | 70 | 10 | | | 1.3 | | 1.0 |
| A7 | 0.2 ethyl acetate | 60 | 100 | Hexamethylene diamine | | | 35 | 75 | 12 | | | 10.1 | 2.8 | 1.0 |
| A7 | do | 100 | 200 | Hydrazine | | | 20 | 75 | 10 | | 3.3 | 4.6 | 0.7 | 1.0 |
| A7 | do | 100 | 200 | Tetramethylene diamine | | | 15 | 75 | 10 | | | 0.6 | | 1.0 |
| A7 | 0.2 carbon tetrachloride | 50 | 75 | do | | | 15 | 75 | 10 | | | 0.7 | | 1.0 |
| A8 | do | 100 | 250 | Ethylene diammonium carbonate | | | 15 | 75 | 10 | 22.4 | | | | 1.0 |
| A9 | 0.1 ethyl acetate | 100 | 100 | Hydrazine | | | 20 | 75 | 10 | | | 1.4 | | 1.0 |
| A5 | 0.2 ethyl acetate | 50 | 200 | Guanidine | | | 20 | 75 | 15 | | | 4.8 | | 1.0 |
| A4 | 0.4 benzene | 50 | 35 | 2,5-diamin-1-methylbenzene plus 0.2 g. of di-butyltin dilaurate as catalyst | As catalyst | | 15 | 80 | 5 | | | 3.3 | | 1.0 |

Example 3

About 10 parts of benzene are added to about 16.8 parts of the NCO terminated prepolymer prepared according to A7 (equivalent to 10 mmol NCO) and about 100 ml. of water are dispersed in this at about 4000 revolutions per minute. The dispersion has a viscosity of about 613 seconds (Ford beaker; 4 mm. nozzle). About 5 ml. of unimolar ethylene diamine solution in water (equivalent to 10 mmol NH₂) are added, and after about 20 seconds stirring the liquid is poured onto an 1100 cm.² glass plate heated to about 70° C. The microporous film obtained after heating for about 12 hours at about 75° C. has a permeability to water vapor of 2.4 mg./hcm.².

Using the same procedure as that described in Example 3, about 11.7 parts (equivalent to 10 mmol NCO) of the NCO terminated prepolymer prepared according to A2 (A), benzene (B), nitromethane (C), chloroform (D) and pentanone-(2) (E), and to each of the resulting solutions, the equivalent quantity (NCO:NH=1 of cyclohexane-diamine-(1,4) (F) and 1,12-diamino-dodecane (G) respectively, each in aqueous solution, is added.

No dispersion is obtained in the case of (H): (column 10) the film obtained does not have a satisfactory surface.

TABLE 4

The following microporous films were prepared according to Example 3

| Solvent | Quantity (ml.) | Mmol. NCO | Dissolved in— | Quantity (gr.) | Water (ml.) | Viscosity (sec.) 4 mm. nozzle | Polyamino compound | Water (ml.) | Stirring time (sec.) | Heating Temp. (°C.) | Heating Time (hr.) |
|---|---|---|---|---|---|---|---|---|---|---|---|
| A | 100 | 20 | Toluene | 20 | | 10.4 11 13.5 | F | 35 | 20 | 80 | 12 |
| B | 100 | | do | 20 | 55 100 | 10.7 11.7 15 | F | | 10 | 75 | 20 |
| C | 100 | | do | 20 | 100 | 10.5 10.3(H) | F | | 15 | 75 | 20 |
| D | 100 | | | | 65 100 | 10.6 12.4 14.5 | G | | 8 | 75 | 20 |
| E | 100 | | | | 65 100 | 10.4 11.6 12.4 | F | | 15 | 75 | 20 |

| NCO terminated prepolymer prepared according to— | Polyamino compound | Tensile strength (kg./cm.²) | Tear propagation resistance (kg./cm.) | Permeability to water vapor (mg./hcm.²) | Thickness (mm.) | NCO/NH |
|---|---|---|---|---|---|---|
| A3 | Ethylene diammonium carbonate | 7.8 | 0.5 | | 1.1 | 1.0 |
| A3 | do | 11.1 | 0.5 | | 0.7 | 1.0 |
| A3 | do | 6.3 | 2.0 | | 1.3 | 1.0 |

Example 4

About 46.8 parts of the NCO terminated prepolymer prepared according to A2 (equivalent to 400 mmol NCO) and about 67.2 parts of hexamethylenediisocyanate (equivalent to 800 mmol NCO) having a viscosity (as mixture) of about 17 sec. (Ford beaker; 4 mm. nozzle) are dispersed with 300 ml. of water at about 4 to 5000 revolutions per minute: The viscosity obtained was 53 sec. (Ford beaker 4 mm.).

About 21 parts of 90% hydrazine hydrate solution (equivalent to 1200 mmol. $NH_2$) are added to the dispersion with about 300 ml. of water, the mixture is stirred for about 8 seconds and is immediately poured onto a 3000 cm.$^2$ glass plate. After heating for about 20 hours at about 80° C., the film has a permeability to water vapor of 1.2 mg./hcm.$^2$.

Example 5

About 60 ml. of benzene are added to about 30 parts of the NCO terminated prepolymer prepared according to A2, and about 30 parts of about a 10% solution of a polyamide (mixed condensate of the hexamethylene diamine of adipic acid and caprolactam) in methanol/water (8:2) are added with stirring. About 1000 ml. of water are dispersed in this solution and the dispersion is poured onto a 600 cm.$^2$ plate and exposed for about 30 minutes to a saturated atmosphere of ethylene diamine at room temperature.

It is then heated for about 10 hours at about 80° C. The microporous film obtained has a permeability to water vapor of 1.7 mg./hcm.$^2$.

Example 6

About 10 parts of the polyamide of Example 5 in the form of about a 10% solution in methanol/methylene chloride/water (4.5:4.5:1) are added to about 50 ml. of 0.2 molar solution of the NCO terminated prepolymer prepared according to A5 (equivalent to 10 mols NCO), and about 150 ml. of water are dispersed in this solution at about 3000 revolutions per minute, about 5 ml. of a unimolar aqueous hydrazine solution are poured into this dispersion and the dispersion is stirred for about 20 seconds and poured onto a 600 cm.$^2$ glass plate which has already been warmed to about 65° C. After heating for about 20 hours at about 65° C., a microporous film is obtained which has a permeability to water vapor of 5.2 mg./hcm.$^2$.

Example 7

About 40 parts of about a 10% solution of the polyamide of Example 5 in methanol/water (9:1) are stirred together with about 15.6 parts (equivalent to 20 mmol NCO) of the NCO terminated prepolymer prepared according to A9, about 50 ml. of ethylene glycol in which the prepolymer is insoluble are dispersed in this at about 4000 revolutions per minute and about 10 ml. of a unimolar ethylene diamine solution in water (equivalent to 20 mmol $NH_2$) are added. The liquid is stirred for about 15 seconds and then poured onto a 700 cm.$^2$ glass plate. After about 3 hours at about 80° C., the glass plate is placed in a dish and the ethylene glycol is washed out with water. After removal of ethylene glycol, the film is dried in air. It has a permeability to water vapor of 17 mg./hcm.$^2$.

TABLE 5

The following microporous films in which NCO:NH=1 were prepared according to the procedure of Example 6

| NCO terminated prepolymer prepared according to— | Quantity of NCO compound (gr.) | Polymer | Percent polymer to dry substance of polyurea | Solvent | Quantity (gr.) | Non-solvent | Quantity (gr.) | Polyamino compound | Stirring time | Reaction Temp. (°C.) | Reaction Time (hr.) | Film thickness (mm.) | Tensile strength (kg./cm.$^2$) | Tear propagation resistance (kg./cm.) | Permeability to water vapor (mg./hcm.$^2$) |
|---|---|---|---|---|---|---|---|---|---|---|---|---|---|---|---|
| A5 | 10.2 | Polyurethane from a polyester of adipic acid and hexanediol with 4,4'-diphenyl methane diisocyanate and butanediol 20% solution in tetrahydrofuran. | 19.5 | Benzene | 36 | Water | 150 | Hydrazine | 25 | 18 | 18 | | | | 6.8 |
| A5 | 3.1 | (30%) acrylonitrile (70%) butadiene polymer to which 30% PVC were added; 10% solution in benzene. | 9.7 | do | 25 | do | 100 | do[1] | 20 | 75 | 15 | | | | 17.5 |
| A5 | 20.4 | Low pressure polyethylene; added in solid form. | 19.4 | do | 72 | do | 350 | Hexamethylene diamine | 15 | 80 | 18 | | | | 7.7 |
| A2 | 11.7 | Polyamide from adipic acid, hexamethylenediamine and caprolactam; 10% solution in methanol/water (8:2). | 8.5 | do | 32 | do | 100 | Hydrazine | 15 | 65 | 18 | 2 | | | 7.5 |
| A2 | 11.7 | Polyamide from adipic acid, hexamethylenediamine and caprolactam; 10% solution in methanol/water (8:2). | 8.5 | do | 32 | do | 100 | do | 15 | 75 | 15 | | | | 6.6 |
| A2 | 11.7 | do | 8.5 | do | 32 | do | 100 | do | 15 | 75 | 15 | 0.35 | 42 | 2.5 | 3.1 |
| A6 | 25.3 | 10% solution in methanol/water (9:1). | 39 | Ethyl acetate | 28 | do | 60 | c-Hexyl-diamine | 20 | 75 | 15 | | | | 0.4 |
| Hexamethylene-diisocyanate[2] | 3.4 / 4.6 | Polyvinyl chloride. | 100 | Benzene / Ethyl acetate | 65 / 5 | do | 10 | Pentaethylene hexamine. | 10 | 60 | 15 | | | 3.6 | |

[1] NCO:NH=0.75.
[2] Reaction product of 3-hexamethylenediisocyanate with water, of the formula $OCN-(CH_2)_4-N(CONH-(CH_2)_4NCO)_2$.

Example 8

73.5 g. (50 mmol NCO) of a polyisocyanate prepolymer which was obtained by reacting of a linear polypropyleneglycolether having an OH number 56 with diphenylmethyl-4,4'-diisocyanate (NCO content: 3.1%) was dissolved in 20 g. of ethyl acetate. A solution of 5 g. (40 mmol NCO) of diphenylmethan-4,4'-diisocyanate in 20 g. ligroin (i.e. a mixture of aliphatic hydrocarbons boiling between 160 and 196° C. having a density of 0.764 at 20° C.) was added with stirring and an additional 55 g. of ligroin was also stirred in with a high speed stirrer (8000 r.p.m.). 41 ml. of a one molar hydrazine carbonate solution in water (containing 82 mmol NH) was stirred in. The stirring was continued for 6 seconds and then the mixture was doctored onto a glass plate. After evaporation of solvent and non-solvent under simultaneous completion of polyaddition reacting at 75° C. a microporous filing was obtained which had a water vapor permeability of 8.8 milligrams/hour and sq. cm., a tensile strength of 26 kg./cm.$^2$ and an elongation at break of 110%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

We claim:
1. A process for preparing a microporous sheet structure which is permeable to water vapor comprising dispersing water into an organic polyisocyanate which is free of organic solvent such that the water constitutes at least about 40 percent by weight based on the weight of polyisocyanate, mixing the dispersion with a substantially equivalent amount of a compound having hydrogen atoms reactive with isocyanate groups on at least two but not more than six nitrogen atoms, applying the resulting reacting dispersion onto a substrate and completing the polyaddition reaction on the substrate while evaporating the water.

2. A microporous sheet structure prepared by the process of claim 1.

References Cited

UNITED STATES PATENTS

| Patent No. | Date | Name | Class |
|---|---|---|---|
| 3,384,506 | 5/1968 | Elkin | 260—2.5 AY |
| 3,551,364 | 12/1970 | McGarr | 260—2.5 |
| 3,575,894 | 4/1971 | Zom et al. | 260—2.5 |
| 3,536,639 | 10/1970 | Schachowskoy | 260—2.5 |
| 3,565,982 | 2/1971 | Day | 264—53 |
| 3,589,929 | 6/1971 | Smolders | 117—63 |
| 3,594,220 | 7/1971 | Schwacke et al. | 117—135.5 |
| 3,595,732 | 7/1971 | Tingerthal | 161—159 |

DONALD E. CZAJA, Primary Examiner

H. S. COCKERAM, Assistant Examiner

U.S. Cl. X.R.

117—135.5; 161—190; 260—77.5 AA

UNITED STATES PATENT AND TRADEMARK OFFICE
CERTIFICATE OF CORRECTION

PATENT NO. : 3,789,027
DATED : January 29, 1974
INVENTOR(S) : Harro Traubel and Wolfgang Klebert It is certified that error appears in the above-identified patent and that said Letters Patent are hereby corrected as shown below:

Column 1, between lines 8 and 9 insert --claims priority, application Germany, October 26, 1966, P 16 94 081.1--

Column 3, line 44, correct the spelling of --other--

Column 8, line 2, correct the spelling of --nozzle--

Column 10, Example 3, 6th line from bottom correct "(NCO:NH=1" so that it now reads --(NCO:NH=1)--; same column, Table 4, under the column headed "Temp.°C" last line, delete the period before "80"

Column 12, Table 5, in the column headed "Temp.(°C)" for A-5, delete "18" and correct it to read --65--; same table, in the column headed "Permeability to water vapor" delete "7.5" and correct it to read --7.4--.

Signed and Sealed this fourth Day of May 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,789,027
DATED : January 29, 1974
INVENTOR(S) : Harro Traubel and Wolfgang Klebert It is certified that error appears in the above-identified patent and that said Letters Patent are hereby corrected as shown below:

Column 1, line 7, after "November 3, 1970" insert --, which is a continuation-in-part of application Serial No. 676,742, filed October 20, 1967, now abandoned--

Column 1, between lines 8 and 9 insert --claims priority, application Germany, October 26, 1966, P 16 94 081.1--

Column 1, line 20, after "Nov. 3, 1970" insert --, which application is a continuation-in-part of application Serial Number 676,742, filed October 20, 1967, and now abandoned--

Column 3, line 44, correct the spelling of --other--

Column 8, line 2, correct the spelling of --nozzle--

Column 10, Example 3, 6th line from bottom correct "(NCO:NH=1" so that it now reads --(NCO:NH=1)--; same column, Table 4, under the column headed "Temp.°C" last line, delete the period before "80"

Column 12, Table 5, in the column headed "Temp.(°C)" for A-5, delete "18" and correct it to read --65--; same table, in the column headed "Permeability to water vapor" delete "7.5" and correct it to read --7.4--

Signed and Sealed this

Twenty-first Day of September 1976

[SEAL]

Attest:

RUTH C. MASON
Attesting Officer

C. MARSHALL DANN
Commissioner of Patents and Trademarks